United States Patent [19]
Kiley

[11] Patent Number: 5,564,623
[45] Date of Patent: Oct. 15, 1996

[54] DURABLE CASE FORMED FROM AN EXPANDED HIGH-DENSITY POLYETHYLENE

[75] Inventor: David L. Kiley, Crawford, Ind.

[73] Assignee: American Trading and Production Corporation, Baltimore, Md.

[21] Appl. No.: 76,309

[22] Filed: Jun. 11, 1993

[51] Int. Cl.⁶ .................................................. B65D 5/18
[52] U.S. Cl. ........................................ 229/164; 229/930
[58] Field of Search ................................. 229/141, 164, 229/940, 930; 206/557; 264/293, 296, 292

[56] References Cited

U.S. PATENT DOCUMENTS

| | | | |
|---|---|---|---|
| 2,024,832 | 12/1935 | Myers | 229/164 X |
| 2,353,298 | 7/1944 | Dorfman | 229/141 X |
| 3,088,651 | 5/1963 | Rasmusson | 229/141 |
| 3,350,492 | 10/1967 | Grootenboer | 264/296 X |
| 3,721,360 | 3/1973 | Collie | 229/940 X |
| 3,727,825 | 4/1973 | Troth | 229/930 X |
| 3,876,130 | 4/1975 | Hease | 229/406 |
| 3,907,193 | 9/1975 | Heller | 229/930 X |
| 3,999,661 | 12/1976 | Jones | 229/2.5 R X |
| 4,005,165 | 1/1977 | Hawkes | 264/292 X |
| 4,183,435 | 1/1980 | Thompson et al. | 206/557 |
| 4,386,926 | 6/1983 | Heller | |
| 4,515,840 | 5/1985 | Gatward | 229/3.5 R X |
| 4,520,927 | 6/1985 | Sato | 229/3.1 X |
| 4,657,177 | 4/1987 | Karabedian | 229/125.42 X |
| 5,184,772 | 2/1993 | McGrath | 229/127 X |

FOREIGN PATENT DOCUMENTS

| | | | |
|---|---|---|---|
| 277864 | 1/1970 | Austria | 229/141 |
| 2674503 | 10/1992 | France | 229/141 |

*Primary Examiner*—Allan N. Shoap
*Assistant Examiner*—Christopher J. McDonald
*Attorney, Agent, or Firm*—Cohn, Powell & Hind, P.C.

[57] ABSTRACT

A receptacle (10), such as an attache case or brief case, has a cover panel (22), back panel (24), front panel (26), top panel (30), bottom panel (32) opposing tabs (34) and opposing side panels (36). The case is made from a unitary sheet of expanded polyethylene. The expanded polyethylene sheet material is produced by encapsulating a thermoplastic blowing agent (azodicarbonamide) within an ethylene vinyl acetate carrier resin to form a pelletized compound which is combined with high-density polyethylene resin and extruded. The melt temperature of the pelletized blowing agent is lower than that of the polyethylene resin, and controls the expansion of the polyethylene resin.

14 Claims, 1 Drawing Sheet

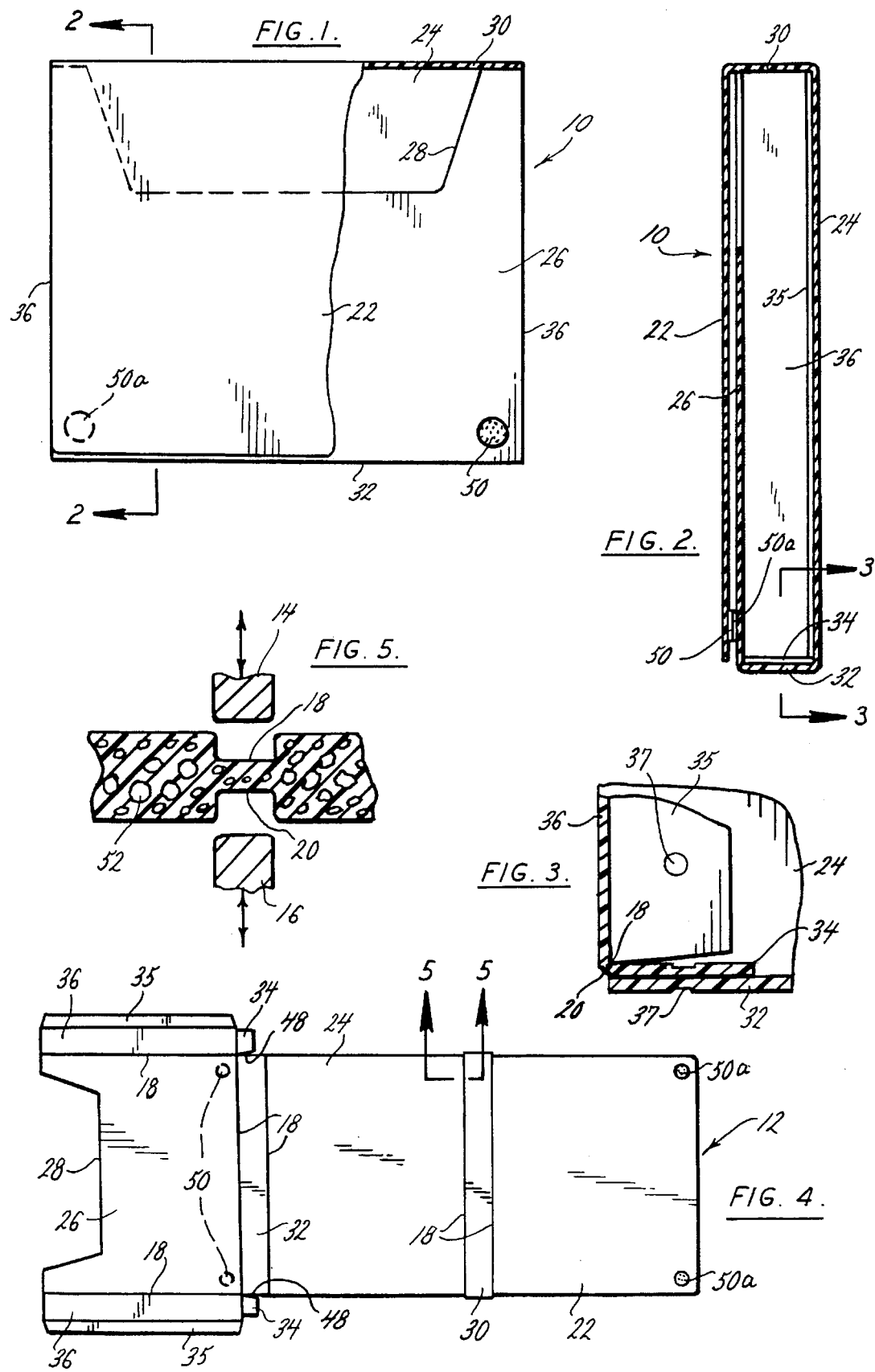

DURABLE CASE FORMED FROM AN EXPANDED HIGH-DENSITY POLYETHYLENE

TECHNICAL FIELD

The present invention relates to lightweight and durable tote boxes and related receptacles designed to protect and facilitate the organization, storage and handling of contents. More particularly, the invention relates to tote boxes and related receptacles made from high density polyethylene resin which, upon extrusion, is expanded.

BACKGROUND OF THE INVENTION

The background art which pertains to this invention embraces several material fields including corrugated paper (i.e.: cardboard), laminated paper (i.e.: layered paper, waxed or plastic covered paper and fabric reinforced paper) and other thermoplastic resinous materials including conventional polyethylene (low density) and styrenic compositions. As will be discussed, however, the present invention exhibits unexpectedly superior physical properties and attributes when compared to the alternate materials and processes referenced herein.

Corrugated paper or "cardboard" is a widely known and employed packaging material available in a vast array of sizes, shapes and gauges and suitable for numerous applications. When compared to the material of the present invention, however, corrugated paper can be seen to exhibit inferior physical properties; thereby comparatively limiting its application.

Specifically, the tensile strength of corrugated paper of the same thickness is considerably less then that of the expanded high density polyethylene material employed by the present invention. The significance of this distinction impacts directly on both the respective ability of the material to protect that which it covers as well as the durability and associated life expectancy of the article/receptacle made from each material.

An equally significant shortcoming of corrugated paper resides in its inability to withstand degradation and deformation when exposed to natural variables such as moisture and ultraviolet radiation. In addition to the obvious adverse effect that moisture has on exposed paper, it is noteworthy that corrugated paper depends, largely, on the adhesive which binds the folds of paper for its strength and durability. When sufficiently exposed to moisture, however, the adhesive is either dissolved or separated from the paper which, in either case, results in a marked loss in integrity of the corrugated receptacle/article. Sustained exposure to sunlight or other ultraviolet source has a similar, adverse affect on corrugated paper by acting to deplete beneficial moisture from the matrices of the paper thereby causing the crystallization of commonly employed adhesives. The net effect of such variables is the disintegration of the corrugated paper.

Receptacles/articles manufactured from laminated paper materials suffer from many of the same infirmities attributable to corrugated paper as noted above. Despite the appreciable increase in strength imparted to paper when two or more layers are joined, the essential character of the material remains unchanged thereby rendering the material susceptible to the same destructive variables burdening corrugated paper. While the application of wax or filmed plastic over laminated paper increases the resistance of the material to moisture and other environmental variables, such measures only retard the known disintegrating effect of environmental forces. Moreover, while it is clear that the application of wax or plastic film over laminated paper results in increased tensile strength, enhanced surface flatness and better shape retention, the degree to which such character is beneficially imparted remains comparatively low when considered in relation to a like size and gauge of the material of the present invention.

Other thermoplastic resinous materials are employed widely in the packaging and protective covering field. For example, conventional polyethylene (PE) sheet material is frequently used in a variety of gauges in the manufacture of notebook binders, folders, document caddies and the like. In contrast to the material of the present invention, however, conventional polyethylene sheet material lacks the same degree of rigidity, flatness and impact resistance associated with expanded polyethylene (EPE) and responsible for the strength and high content-protection index of EPE.

Styrenic compositions, as alluded to above, are also used widely as packaging materials. Two of the more commonly used of these materials are conventional polystyrene (PS) and expanded polystyrene (EPS). Conventional PS is a rigid material and is available in a vast array of gauges. Insofar as it is used in packaging, it is perhaps best known for its use in thin-gauge sheeting because of its excellent optical properties. When extruded in progressively thicker gauges, as is necessary in the manufacture of protective receptacles, however, this material exhibits a significant physical impairment; proneness to fracture or brittleness. While brittleness is an inherent characteristic of PS under all environmental conditions, it is also known that low temperature environments markedly exacerbate this material weakness.

Like the material of the present invention, expanded polystyrene is produced by incorporating a blowing agent into the resinous substrate which, upon extrusion, causes the resin to expand. Expansion then results in a macrocellular structure within the finished material. Despite the similarity in production methods, however, the end products, due to their respective chemical natures, are substantially dissimilar. Expanded PS forms a soft, spongy product which exhibits excellent thermal insulating properties but very poor tensile strength and durability. Expanded PS is commonly known under its tradename "Styrofoam." Expanded PE, conversely, forms a hard-surfaced product characterized by comparatively superior tensile strength, light weight and durability.

Illustrative methods relating to the expansion of polyethylene resin are disclosed in U.S. Pat. Nos. 3,098,831; 4,473,516; 4,552,708; 4,738,810; 4,952,352; and Japanese Patent No. 0174423. In general, these references teach methods of expanding a low density polyethylene starting material employing both blowing and cross-linking agents. The disclosure of these patents is incorporated by reference herein.

U.S. Pat. No. 3,098,831 to Carr discloses a method for expanding polyethylene which, unlike the material of the present invention, involves the blending of linear polyethylene with a rubber blowing agent simultaneously with the addition of an organic peroxide which, when irradiated, is claimed to cause cross-linking without adversely affecting the rubber blowing agent.

U.S. Pat. No. 4,473,516 to Hunerburg discloses both a method and related apparatus directed to making a foamed thermoplastic article substantially free from surface imperfections. The invention accomplishes this objective by providing for a non-foamed molded surface with a foamed core. Unlike the method used for producing the material of the present invention, however, this invention requires the use of an activator additive (i.e.: stearic acid, octanoic acid, etc.) in conjunction with the preferred blowing agent (sodium borohydride) in order to expand the thermoplastic resin.

U.S. Pat. No. 4,552,708 to Kimura, et al. like the references above, discloses a method for expanding a thermoplastic resin which involves the cross-linking of the resin prior to expansion induced by a blowing agent.

U.S. Pat. No. 4,738,810 to Cheng-Shiang discloses, preferentially, a method for making a foamed thermoplastic material by employing a mixture of linear, low density polyethylene and conventional low density polyethylene resins which are ground into powder prior to combination with cross-linking and blowing agents in order to control the extent to which cross-linking occurs. The method relating to the production of the material of the present invention requires neither the grinding into powder of the starting resin nor the employment of cross-linking agents.

U.S. Pat. No. 4,952,352 to Shin discloses a method directed to the production of a low density foamed article characterized by superior buoyancy and thermal resistance. Unlike the method employed in making the material of the present invention, however, this invention calls for a 2-step blowing (expanding) procedure and an extended cooling period of at least 24 hours.

Japanese Patent No. 0174423 to Showa Electric Wire discloses a method which, while similar to that employed in making the material of the present invention, requires a combination of blowing agent compounds and which, preferentially, employs a low density polyethylene resinous base.

The object of this invention, therefore, is to provide a foamed thermoplastic article of superior physical character which is produced from a comparatively simple and effective process rendering the article relatively easy and economical to make and desirably appropriate for use as a packaging/covering material.

SUMMARY OF THE INVENTION

In accordance with the present invention there is provided an expanded thermoplastic material which, when extruded within a defined gauge range and used in the production of storage boxes, carrying cases and other receptacles produces articles characterized by superior physical properties including excellent impact resistance, durability, moisture/thermal resistance and light weight. In addition, the material exhibits an unusual and aesthetically desirable surface finish; is completely pigmentable; is readily adaptable to a wide array of closure and handling hardware; and is amenable to a host of imprinting methods including silk screening, foil stamping and debossing. Moreover, the desirably inherent cellular character of the material unexpectedly permits, die cutting to be accomplished with very little force and the formation of seams to be effectively accomplished by simple die scoring, thereby rendering unnecessary the more costly and less efficient operation of hot scoring. The inherent material character also permits permanent joinder of the material by sonic welding which renders unnecessary the use of special adhesives and/or joinder hardware such as rivets and other mechanical fasteners, though these methods may also be used in some instances.

The process for making the material of the present invention involves combining high density polyethylene resin material with a blowing agent compound in sufficient weight percentage quantities that, when gradually heated to a temperature between about 340°–360° F. and just prior to extrusion, the blowing agent decomposes and, in so doing, releases gases that cause the formation of uniformly dispersed bubbles or cells within the resinous melt stream. As the melt stream exits the die lip and is exposed to ambient air, swelling occurs within the stream at which point the actual sheet thickness is established within a feasible sheet stock gauge range of between 0.02–0.180 in. (0.05–0.5 cm).

Following the extrusion process, the sheet stock material of the present invention is easily die stamped into either readily assembled individual panels or the unitary configuration of the preferred receptacle, whereafter a combination of simple die scoring and sonic welding procedures are performed resulting in the finished article ready for the attachment of customized hardware and treatment with customer-specified adornment.

BRIEF DESCRIPTION OF THE DRAWINGS

FIG. 1 is a partially cut away, elevational view of a tote receptacle according to the invention;

FIG. 2 is a cross-sectional view of the receptacle, taken on line 2—2 of FIG. 1;

FIG. 3 is an enlarged fragmentary cross-sectional view of the receptacle showing the inner and outer aspects of a die-scored corner seam, taken on line 3—3 of FIG. 2;

FIG. 4 is a plan view of the receptacle depicting the receptacle in a die-cut unitary configuration, and FIG. 5 is an enlarged partial cross-sectional view of receptacle material taken on line 5—5 of FIG.4 showing the macrocellular interior composition and smooth, non-permeable inner and outer surfaces of the material together with the compression effect of die-scoring thereon.

DESCRIPTION OF THE PREFERRED EMBODIMENTS

A variety of materials are commonly employed within the packaging/protective coverings industry, each chosen for a given application based on a variety of factors which, invariably, include durability and relative expense. The material employed in the present invention, while characterized by remarkable durability and impact resistance, is also produced economically. Due to the chemical action of the blowing agent, the weight to mass ratio of a comparably sized specimen of expanded PE is as much as 40% less than that of conventional PE. A direct function of this marked reduction in density, and a significant economic aspect, is an equally marked reduction in the consumption of PE resin starting material. This material can be formed into cases such as attache cases, cartons and boxes which have greatly increased and unexpected strength, durability and aesthetic properties.

A carrier base resin with an encapusulated chemical blowing agent is combined with a high density PE resin starting material and by controlling the timing of the chemical action of the blowing agent, which results in the release of nitrogen and other gases into the starting material melt stream, greater control over the character of the finished product can be achieved.

Specifically, the material employed by the present invention is prepared by combining approximately 20% by weight azodicarbonamide blowing agent with a weight percentage balance of ethylene vinyl acetate (EVA) which serves as a carrier resin. This combination results in the encapsulation of the azodicarbonamide in the form of a pelletized compound. This compound is then evenly blended with high density PE starting resin in an approximate weight percentage concentration of about 2. Thereafter, the resinous combination is gradually heated in order to form a flowable melt stream. Because the EVA requires a lower temperture than PE to melt, it becomes fluid much quicker than PE and promotes even distribution of the azodicarbonamide particles throughout the material melt stream. As the melt stream progresses through the temperature range of about 340°–360° F. the azodicarbonamide particles decompose and produce the gases which are suppressed until the melt stream exits the extruder. At that juncture, because of the pressure reduction and change in ambient temperature, the expansion occurs. Trial and error experimentation has shown that, in order to obtain the best result, the above temperature range should be attained just prior to when the melt stream exits the die. Upon decomposition, the azodicarbonamide compound reacts in response to the heat to release nitrogen and other gases which cause the formation of small bubbles or cells within the innermost regions of the high-density PE melt stream. As the stream exits the die into ambient air, both the released gases and the resinous melt stream experience an immediate cooling effect along with a low pressure environment which causes the resin to swell. At this point, finished sheet thickness is established using conventional calendering methods. While a vast range of finished sheet thicknesses is possible in accordance with this process, experimentation has shown that finished sheeting within the gauge range of about 0.02–0.18 in (0.05–0.5 cm), and having a density of about 0.955 to 0.960 gm/cubic cm., exhibits the combination of desirable material features heretofore discussed. The finished sheet stock, which is limited in area only by available extrusion equipment, may then be die scored and/or cut with relative ease according to specific application requirements. Other modifying materials, such as conventional dyes, pigments and lakes, and anti-static compounds, may be incorporated into the powdered starting material, by mixing, prior to extrusion.

Referring now by reference numerals to the drawings and first to FIGS. 1, 2, and 4, it will be understood that a receptacle 10 is formed from a unitary blank 12 die-cut from a sheet of the described expanded high-density polyethylene (not shown). In the embodiment shown, the blank 12 includes a cover panel 22 substantially identical in dimension to a back panel 24 and a front panel 26. Also substantially identical in dimension are, respectively, opposing side panels 36 opposing tuck tabs 34, edge tabs 35 and bottom 32 and top 30 panels. The cover panel 22 is separated from the back panel 24 by the top panel 30 and the back panel 24 is separated from the front panel 26 by the bottom panel 32. Each of the referenced panels and including the tuck tabs is planar substantially in the shape of a quadrilateral, preferably substantially rectangular, and an access cut 28, substantially trapezoidal in shape, is die-cut into the front panel 26. Mechanical fasteners 50 and 50a, for example adhesively attached mating Velcro patches, are included as closure means.

As linearly depicted in FIG. 4, the unitary blank 12 contains a series of die-scorings 18 which facilitate the bending and folding of the various panels in order to form the receptacle 10. For purposes of illustration only, and beginning from right to left, the receptacle may be constructed by folding the cover panel 22 along the die-scoring 18 and, similarly, folding the back panel 24 toward the inside surface of the cover panel 22 thereby defining the top panel 30. Continuing to the left, the back panel 24 is next folded along the die-scoring 18 at the region of the bottom panel 32.

Next, the front panel 26 is folded along the die scoring 18 at the region of the bottom panel 32 with the fold continuing onto the region of the opposing tuck tabs 34. The edge tabs 35 are then folded inwardly along their die scorings 18. The opposing side panels 36 are then, respectively, folded inwardly along the die-scorings 18 at the region of the inside surface of the front panel 26. Because the opposing tuck tabs 34 are die cut at 48 at the region where each adjoins the inside surface of the bottom panel 32, the tuck tabs 34 readily slide into position over the inside surface of the bottom panel 32 during the above-described folding of the opposing side panels 36. Similarly, the edge tabs 35 readily slide into position over the inside surface of the back panel.

Upon completion of the folding described above, the opposing side panels 36 are brought into alignment with back panel 24 such that the edge tabs 35 overlap the inside surface of the back panel 24 such that resulting corners of substantially 90 degrees are formed. The edge tabs 35 are then attached to the back panel as by sonic spot welds 37. Additionally, the opposing tuck tabs 34 are each affixed, as by sonic spot welds 37, to the inside surface of the bottom panel 32 for added transverse rigidity and strength of the receptacle.

In FIG. 2, the receptacle 10 is shown following the folding procedures outlined above. In particular, the outside surfaces of the bottom 32, front 26, back 24, top 30 and cover 26 panels are revealed. Moreover, the registration of the Velcro fasteners 50, 50a, is achieved when the cover panel 46 is brought to its closed position.

The effect of mechanical die-scoring on the material of the present invention is depicted in FIG. 5 which shows the upper 14 and lower 16 die components which compress the panel material to form the inner 18 and outer 20 depressions of the resulting die-score. Also shown is an enlarged, graphically depicted cross-section of the subject material revealing the macrocellular 52 nature of its interior.

In the enlarged, fragmentary view represented by FIG. 3, the inner 18 and outer 20 depressions of a folded die score are highlighted. It will be readily appreciated that, while the embodiment of the invention heretofore described and depicted by FIGS. 1–5 is preferred, any number of variations to the preferred configuration are possible without departing from the spirit of the invention and without adversely affecting the vast number of beneficial applications to which the invention is inherently and readily adaptable.

For example, while the figures show top 30, bottom 32 and opposing side 36 panels of comparatively smaller dimension than the depicted cover 22, back 24 and front 26 panels, the invention equally embraces embodiments wherein these comparative dimensions are substantially more similar. Likewise, the cover panel 22 can be shorter. Moreover, if desired the cover panel 22 and top panel 30 can be omitted completely to form an open top slip case with the front panel 26 and back panel 24 being of substantially the same height and provided with finger cutouts 44, the open top providing an entry for periodicals to be stackably inserted. Where more insulation from environmental variables is desired, this same periodical receptacle can be augmented to include a substantially identical, slightly larger, covering receptacle which can be slideably inserted over the section of the receptacle containing the stored material.

In addition, other embodiments of the invention reside in configurations which, either wholly or in part, incorporate fixedly attached, individual panels unlike the preferred unitary construction discussed and depicted. Still other foreseeable embodiments include or exclude features not yet discussed. Specifically, the invention contemplates configurations which embody built-in hardware such as carrying handles and also includes configurations exhibiting panels both fewer and greater in number.

These variations are provided for illustration purposes only and are specifically not intended to limit the invention as disclosed and claimed herein.

I claim as my invention:

1. An attache case for carrying personal articles having an overall rectangular shape enclosing an open volume for receiving articles therein, the volume being contained within substantially planar panels of expanded high-density polyethylene sheet having a cellular structure, the panels having a thickness of between about 0.02 and 0.180 gauge (inches) and having smooth, closed, substantially non-porous ink receiving surfaces, the panels including front, back, bottom, side and top panels and a covering flap panel, the panels being formed from a unitary blank, the boundaries of adjacent panels being defined by non-heated compression die scores imparting flexibility to the polyethylene sheet, the scores partially compressing the cellular structure of the expanded high-density polyethylene sheet and imparting flexibility thereto, the case further having tabs extending from the side panels, the tabs being defined by non-heated compression die scores at the boundary of the side panels, the tabs being fixedly fastened to the front or back panels by welding to form the constructed case, the case further having releasable fastening means for fastening the cover to the case and releasing the cover to permit entry to the enclosed volume of the case.

2. A receptacle made from a unitary blank of expanded high density polyethylene sheet having a cellular structure, the receptacle comprising:

a front panel, a back panel, a bottom panel disposed between said front and back panels and defined by a fold line between said front and bottom panel and a fold line between said back and bottom panel said front and back panels being folded toward each other about said fold lines, opposed side panels each defined by a fold line between said side panel and one of said other panels said side panels being folded toward each other about said fold lines, and opposed edge tabs each defined by a fold line between said tab and an associated side panel and being folded toward said side panel, each of said edge tabs being fixedly attached by welding to the same one of said other panels, said fold lines being defined by non-heated compression die scores.

3. The receptacle of claim 2, further comprising:

opposed second tabs each defined by a fold line between said tab and an associated side panel and folded toward said side panel each of said second tabs being fixedly attached by welding to one of said other panels, said fold lines being defined by non-heated compression die scores.

4. The receptacle of claim 2 further comprising:

a top panel and a cover panel, said top panel being disposed between said rear panel and said cover panel and being defined by a fold line between said back and top panel and a fold line between said top and cover panel said back and cover panels being folded toward each other about said fold lines and said cover panel providing a cover overlappingly related to said front panel, said fold lines being defined by non-heated compression die scores.

5. The receptacle of claim 4 in which:

the front panel and the cover panel include mating Velcro fasteners.

6. The receptacle of claim 2, in which:

the fold lines are formed by non-heated compression die scoring said blank on both sides thereof.

7. The receptacle of claim 2, in which:

the sheet material is extruded within a gauge range of about 0.02–0.180 gauge (inches) (0.05–0.5 cm).

8. The receptacle of claim 2, in which:

the expanded polyethylene resin material is produced by combining high-density polyethylene resin with a sufficient weight percentage amount of azodicarbonamide blowing agent to cause uniform dispersion of nitrogen and carbon dioxide gases within a melt stream when heated to a temperature of about 340°–360° F.

9. The receptacle of claim 8, in which:

the blowing agent is mixed with the resin in a weight percentage concentration of about 2.

10. The receptacle of claim 9, in which:

the blowing agent is mixed with the resin in the form of an encapsulated pellet comprised of about 20 weight percent azodicarbonamide and 80 weight percent ethylene vinyl acetate.

11. The receptacle of claim 10, in which:

the high-density polyethylene resin is blended with an anti-static agent in a weight percentage quantity of about 1 and including a pigment compound.

12. The receptacle of claim 2, in which:

the tabs are attached to the associated panels by means of sonic welds.

13. The receptacle of claim 2, in which:

the expanded resinous sheet has a density of between about 0.575 to 0.590 gm/cubic cm.

14. The receptacle of claim 2, in which:

the expanded sheet has a substantially smooth, closed, substantially non-porous, ink-receiving surface.

* * * * *